NICHOLAS LUMSDEN AND FRANK LESSMANN, OF OAKLAND, CALIFORNIA.

Letters Patent No. 91,647, dated June 22, 1869.

IMPROVED COMPOUND FOR SALVE.

The Schedule referred to in these Letters Patent and making part of the same.

*To all whom it may concern:*

Be it known that we, NICHOLAS LUMSDEN and FRANK LESSMANN, of Oakland, in the county of Contra Costa, and State of California, have invented a certain new and useful Compound for Salve; and we do hereby declare that the following is a full and exact description of the ingredients used, and the manner of mixing or compounding them, to make the said salve, are described in the following specification.

The constituents we employ are rosin, beeswax, mutton-suet, fluid elixir of vitriol, oil of vitriol, and gum-camphor, in the following proportions:

One (1) ounce beeswax.
One (1) ounce mutton-suet, rendered.
One-half (½) ounce fluid elixir of vitriol.
One-fourth (¼) ounce of oil of vitriol.
One-eighth (⅛) ounce gum-camphor.

Melt the rosin, beeswax, and mutton-suet together. The elixir and oil of vitriol are then added, and the whole compound stirred until cool, when it may be put up in boxes of the desired size, for use.

In using, first bathe the feet in warm water, then apply the salve to the parts affected, on a soft piece of muslin or cotton rag, and over it bind a flannel cloth.

By the use of our compound, rheumatism, chilblains, and frozen feet are surely and speedily cured.

Having thus described our invention or discovery,

What we claim, and desire to secure by Letters Patent, is—

The within-described medicine, made of the ingredients enumerated, mixed, or compounded in about the proportions herein specified.

In witness whereof, we have hereunto set our hands and seals.

NICHOLAS LUMSDEN. [L. S.]
FRANK LESSMANN. [L. S.]

Witnesses:
C. W. M. SMITH,
E. V. SUTTER.